Aug. 20, 1940.  G. H. HUFFERD ET AL  2,211,817
SEALED LUBRICATED JOINT
Filed Oct. 21, 1937
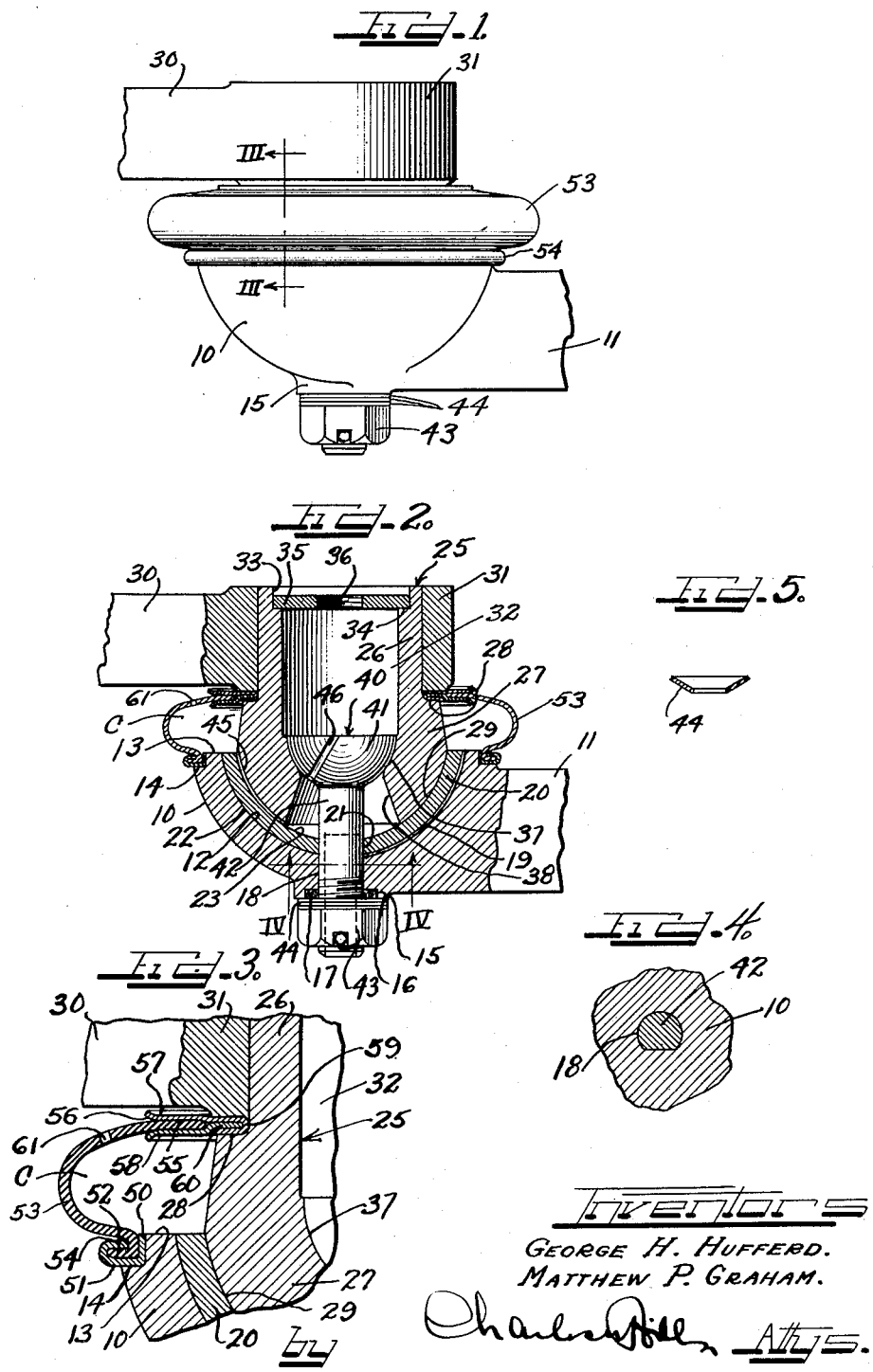

Patented Aug. 20, 1940

2,211,817

UNITED STATES PATENT OFFICE 2,211,817

SEALED LUBRICATED JOINT

George H. Hufferd and Matthew P. Graham, Detroit, Mich., assignors to Thompson Products, Incorporated, Cleveland, Ohio, a corporation of Ohio Application October 21, 1937, Serial No. 170,149

6 Claims. (Cl. 287—90)

This invention relates to joints suitable for universally connecting wheel supports with a vehicle mounting, and more specifically relates to sealed universal joints having reservoirs for grease or other lubricants to supply lubricant to the bearing surfaces of the joints.

The joints of this invention can be packed with sufficient lubricant when they are assembled, to insure proper lubrication of the bearing surfaces thereof for almost the entire life of the joint. The joints are subjected to heavy compression loads and are so arranged as to permit free tilting and rotating movement between the connected parts even when heavily loaded. The bearing surfaces of the joints are constantly urged into proper seating relation with their bearing seats. The joints of this invention are adjusted or regulated from outside of the joint housings and thus do not require disassembly of the constituent parts to loosen or tighten the working members.

An important feature of this invention is the manner in which a flexible seal is mounted at its ends on relatively movable parts of the joint to define with said parts an annular chamber adapted to retain lubricant. This seal mounting permits free relative rotation between the parts and does not interfere with relative tilting movements between the parts. During such tilting movements, the seal may be flexed to work lubricant in the chamber defined thereby, then along lubricant passageways into the joint housing. The seal therefore acts as a pump to flush lubricant along the bearing surfaces of the joints.

It is then an object of this invention to provide sealed mountings for lubricated universal joints that permit free relative rotative and tilting movements between the joint parts.

A further object of this invention is to provide a ball joint having a large lubricant reservoir therein for supplying lubricant to the bearing surfaces of the joint, even when the joint is subjected to heavy compression loads.

Another object of the invention is to provide a universal joint housing for wheel supports.

Another object of this invention is to provide wheel support joints with automatic wear take-up means that can be manually adjusted from outside of the joint housing.

A further object of this invention is to provide a joint having a flexible annular seal fixedly secured to the joint housing at one end thereof and slidably secured to the ball member of the joint at the other end thereof.

Other and further objects of this invention will become apparent to those skilled in the art from the following detailed description of the annexed sheet of drawings which discloses a preferred embodiment of the invention.

On the drawing:

Figure 1 is a side elevational view of a sealed joint according to this invention;

Figure 2 is a vertical cross-sectional view, with parts in elevation, of the joint shown in Figure 1;

Figure 3 is an enlarged vertical cross-sectional view taken along the line III—III of Figure 1;

Figure 4 is a fragmentary horizontal cross-sectional view taken along the line IV—IV of Figure 2;

Figure 5 is a vertical cross-sectional view of a conical spring washer used in joints of this invention.

As shown on the drawing:

In Figures 1 and 2, the reference numeral 10 designates a bowl-shaped housing or socket for the joint having a laterally extending arm 11 for connection to a wheel support (not shown). As shown in Figure 2, the housing 10 has a segmental spherical recess 12, a flat annular top portion 13, an external annular shoulder 14 on the top 13, and a downwardly extending lug portion 15 having a recess 16 therein. A felt washer 17 is seated in the recess 16 of the lug portion 15.

As best shown in Figures 2 and 4, a D-shaped hole 18 is formed through the bottom of the housing 10 and through the central portion of the lug extension 15 of the housing. As shown in Figure 2, a groove 19 is formed in the wall of the recess 12 of the housing 10 and extends from the hole 18 to the top 13 of the housing. A plurality of such grooves may be formed in the recess 12 and, if desired, these grooves may be connected with each other by means of annular grooves formed in the recess 12.

A segmental spherical seat member 20 is seated in the recess 12 of the housing 10 and has a hole 21 through the bottom thereof in alignment with the hole 18 of the housing. The seat member 20 has an external segmental spherical bearing surface 22 engaging the segmental spherical wall of the recess 12 and an internal segmental spherical surface 23, for a purpose to be hereinafter described.

As shown in Figure 2, a stud member 25 having a cylindrical shank portion 26 and an enlarged head portion 27 separated from the shank portion 26 by an annular shoulder 28 is mounted in the housing 10 and extends above the top 13 of the housing. The enlarged portion 27 of the stud 25 has a rounded end 29 seated on the segmental spherical wall 23 of the seat member 20. An arm member 30 has an eye end 31 disposed around the cylindrical shank portion 26 of the stud 25 above the shoulder 28. The eye end 31 of the arm member 30 may be force-fitted on the shank 26. The arm member 30 extends to a mounting on the vehicle (not shown).

The stud 25 has a cylindrical bore 32 extending from the top of the stud into spaced relation from the bottom thereof. The bore 32 may be counterbored at 33 to provide a shoulder 34 at the top of the bore for receiving a closure plate 35. The plate 35 can be sprung into the counterbore 33 against the shoulder 34. A lubricant plug 36 or other lubricant fitting can be threaded through the central portion of the closure plate 35. A segmental spherical bearing wall 37 extends inwardly from the bottom of the bore 32 in spaced relation above the segmental spherical end 29 of the head 27. A bore 38 tapers outwardly from the base of the segmental spherical seat 37 and extends to the bearing surface 29 of the head 27.

A bolt 40 has a segmental ball head 41 seated on the seat 37 of the stud member 25 and a D-shaped shank portion 42 extending from the head 41 through the tapered bore 38, through the hole 21 of the seat member 20 and through the hole 18 of the housing 10. The shank 42 extends from the bottom of the housing 10 and receives a nut 43 in threaded relation therearound. A plurality of conical washers 44 are disposed around the shank 42 between the lug 15 and the nut 43. These washers, as best shown in Figure 5, are initially of a tapered or conical shape, and when the nut 43 is threaded upon the shank 42 to seat the head 41, these washers 44 are forced into a somewhat flat position. Since they are made of spring material, they tend to assume the conical position shown in Figure 5, and will thus resiliently urge the bolt member towards the bottom of the housing, thereby maintaining the head 41 of the bolt in proper seating relation on the seat 37 as well as maintain the bearing surface 29 on the bearing surface 23, and the bearing surface 22 on the wall of the recess 12.

A groove 45 can be formed in the head 27 of the stud 25 from the mouth of the tapered bore 28 to the outer surface of the head. A plurality of such grooves can be used, if desired. The groove section 45 will convey lubricant along the bearing surfaces 29 and 23. A groove 46 can be formed in the head 41 of the bolt 40 for joining the bore 32 with the bore 38.

As best shown in Figure 3, a metal ring member 50 is pressed over the top 13 of the housing 10 against the shoulder 14 of the housing. The ring member 50 has a laterally extending base portion 51. The bottom end 52 of an annular flexible seal 53 is disposed around the ring member 50, and the base 51 of the ring member is crimped over the end 52, as at 54, to hold this end of the sal 53 tightly on th housing 10. The seal 53 may be composed of leather, lubricant-resisting rubber-like material, fabric, or the like.

The top end 55 of the seal 53 is slidably seated in the mouth 56 provided by two annular metal members 57 and 58. The metal member 57 has a crimped portion 59 compressed between the shoulder 28 of the stud member 25 and the eye end 31 of the arm 30. A tail portion 60 of the ring member 58 is held between the legs of the crimped portion 59 of the member 57. Therefore, the legs of the crimped portion 59 are pressed tightly against the tail 60 of the ring member 58 to hold this ring member in assembled relation. However, the mouth 56 provided between the ring members 57 and 58 will be of a constant size, irrespective of the amount of pressure supported by the crimped portion 59, since the tail 60 will not permit a change in size of the mouth.

Since the upper end of the seal 53 actually has an annular mouth, the seal will not become unseated from between the spring members 57 and 58, although the same can freely slide between these members. A small hole, such as a pinhole 61, is formed through the seal 53 for a purpose to be hereinafter described.

The joints of this invention are charged with lubricant by removing the plug 36 or by replacing this plug 36 with a lubricant fitting. A grease-gun is then operated to force lubricant into the bore 32 of the stud member 25 to completely fill the reservoir provided by this bore. The pressure of the grease-gun will also force lubricant through the passageway 46 of the bolt head 41 to fill the tapered bore 38. The passageway 45 in the head 27 of the stud will convey some of this lubricant to the chamber C defined by the top 13 of the housing, the head 27 of the stud and the seal 53. This entire chamber may be filled with lubricant at the time of initially charging the joint with lubricant. The pinhole 61 permits air to escape from the chamber C and prevents rupture of the seal 53, should a very high grease-gun pressure be used.

During articulated movement betwene the arm 30 and the housing 10, the seal 53 is, of course, flexed, and this flexing operation may cause lubricant in the chamber C to flush back and fourth along the grooves 19 and 45, thereby supplying lubricant to the bearing surfaces. Of course, such flushing action is not necessary to maintain these bearing surfaces well lubricated, since the joint is entirely filled with lubricant and the surfaces will be lubricated by merely picking up the lubricant from the various chambers in the joint.

In operation, the D-shaped shank 42 of the bolt 40, seated in the D-shaped hole 18 of the housing, prevents rotation of the head 41 of the bolt. The stud member 25 can tilt freely relative to the housing 10 on the bearing surface 29 of the seat member 20 and on the ball end 41 of the bolt. Likewise, the stud 25 can rotate about its own axis relative to the housing 10 on the bearing surface 22 of the seat member and on the ball end 41 of the bolt.

Should the respective bearing surfaces of the joint wear away to such an extent that the spring washers 44 cannot take up all of the looseness developed in the joint, the nut 43 can be turned from outside of the housing 10 to again compress the spring washers 44 to the desired amount for taking up further wear. The felt washer 17 seals the interior of the joint from loss of lubricant through the holes 21 and 18. The hole 21 in the seat 20 is preferably cylindrical to permit passage of lubricant along the flat side of the D-shaped shank 42 into the groove 19, and furthermore to permit rotation of the seat 20 in the recess 12.

From the above description, it should be understood that this invention provides universal joints permitting free tilting and rotative movement between the respective joint parts throughout a wide range and further provides a large lubricant reservoir for storing oil, grease or the like lubricant and supplying this lubricant to the bearing surfaces during working of the joints. The joints of this invention are effectively sealed by a flexible seal member which also functions to aid lubrication of the bearing surfaces.

Obviously, the grooves 19 and 45, instead of being formed in the recess 12 and head 27, can be formed on opposite sides of the seat 20.

We are aware that many changes may be made and numerous details of construction may be varied through a wide range without departing from the principles of this invention, and we, therefore, do not purpose limiting the patent granted hereon otherwise than is necessitated by the prior art.

We claim as our invention:

1. A sealed universal joint comprising a socket having a segmental spherical recess therein, a hollow cylindrical member having an external rounded end portion tiltable in said recess of the housing and an internal ball seat, a bolt having a head portion tiltable on said ball seat, and a shank portion extending through the socket, means urging the bolt to maintain the head portion in seated engagement on the ball seat and the rounded end portion of the cylindrical member in the socket recess, a flexible seal mounted at one end thereof around the socket and at the other end thereof around the cylindrical member in spaced relation from the socket to define with the socket and cylindrical member an annular chamber, a closure member in spaced relation from said bolt head sealing the free open end of the cylindrical member whereby lubricant can be sealed in the cylindrical member, and means defining lubricant passageways for conveying lubricant to the bearing surfaces of the joint, said flexible seal retaining lubricant in the joint while allowing articulated movement between the cylindrical member and housing.

2. A sealed universal joint comprising a bowl-shaped housing having a hole through the bottom thereof, a segmental spherical seat member disposed in said housing having a hole therethrough in alignment with the hole through the housing, a stud member having a ball end seated on said seat member, said stud member having a lubricant reservoir therein and a ball seat at the bottom of said reservoir, a tapered bore joining the ball seat with the ball end of the stud, a bolt having a segmental spherical head portion seated on said ball seat of the stud and a shank portion extending through the holes of the seat member and housing, a nut threaded on the end of the shank outside of the housing, spring means disposed between the nut and the housing for urging the ball head into proper seating relation on the ball seat, an annular seal secured at its ends to the housing and to the stud member respectively, said seal being spaced from the housing and stud intermediate its ends to define a chamber between said members, lubricant passageways formed between the ball head and ball seat and the ball end of the stud and seat member for conveying lubricant from the reservoir to the chamber defined by the seal.

3. In a universal joint, including a stud member having an external annular shoulder and an arm member having an eye end disposed around said stud member above said shoulder, the improvement which comprises a ring member extending laterally from said shoulder, a second ring member disposed in spaced relation above said first mentioned member and having an end portion crimped around the inner end of said first mentioned ring member, said ring members being held between said shoulder and said eye end of the arm, and an annular flexible seal slidably seated between the ring members.

4. In a universal joint having a housing and a stud member tiltably and rotatably mounted in said housing, said stud member having a cylindrical portion extending from the housing, an annular shoulder formed on said stud member above the housing, ring members defining a laterally extending groove therebetween pressed on said stud member against said shoulder, and a flexible seal having the top end thereof slidably seated between said ring members.

5. A universal joint capable of supporting heavy compression loads comprising a hollow stud member having a segmental spherical end and an internal ball seat, a bowl-shaped housing receiving the segmental spherical end of the stud in tiltable and rotatable relation thereto, a bolt having a ball head portion tiltably mounted on said ball seat of the stud and having a shank portion extending through the housing, a nut threaded on the shank portion of the bolt below the housing, spring means disposed between the nut and the housing for urging the bolt head toward the bottom of the housing, a flexible seal defining an annular chamber above the housing around the stud, means for introducing lubricant into the stud, and lubricant passageways joining the interior of the stud with the chamber around the stud.

6. A joint comprising a housing, a stud movably mounted in said housing and projecting therefrom, said stud having an aperture extending longitudinally therethrough with an inturned bearing seat intermediate the ends thereof, a bolt in said aperture having a head portion thrusting against said inturned bearing seat in said aperture in movable relation thereto, said bolt having a shank portion extending through said housing, means on said shank portion thrusting against said housing to draw the bolt head toward said bearing seat for holding said stud in said housing, an annular seal secured at its ends to the housing and to the stud respectively, said seal being spaced from the housing and stud intermediate its ends to define a chamber between the housing and stud, and means for inserting lubricant in said joint to be held therein by said seal for lubricating the bearing surfaces of the joint.

GEORGE H. HUFFERD.
MATTHEW P. GRAHAM.